United States Patent [19]
Wollen

[11] Patent Number: 5,393,310
[45] Date of Patent: Feb. 28, 1995

[54] ARTIFICIAL FIREPLACE LOG AND METHOD FOR MAKING THE SAME

[76] Inventor: Kenneth E. Wollen, 6812 N. 65th Ave., Omaha, Nebr. 68152

[21] Appl. No.: 216,913

[22] Filed: Mar. 23, 1994

[51] Int. Cl.⁶ ............................................. C10L 5/00
[52] U.S. Cl. ................................. 44/535; 44/553; 44/555; 44/576; 44/596
[58] Field of Search ............... 44/535, 553, 555, 589, 44/576, 579, 590, 605, 606, 596

[56] References Cited

U.S. PATENT DOCUMENTS

| | | | |
|---|---|---|---|
| 379,490 | 3/1888 | Owen | 44/579 |
| 3,297,419 | 1/1967 | Eyre, Jr. | 44/6 |
| 3,660,055 | 5/1972 | Haller | 44/6 |
| 3,726,652 | 4/1973 | Schick | 44/14 |
| 3,843,336 | 10/1974 | Messman | 44/535 |
| 3,910,775 | 10/1975 | Jackman | 44/589 |
| 4,104,034 | 8/1978 | Wu et al. | 44/10 R |
| 4,169,709 | 10/1979 | Stima | 44/10 R |
| 4,179,269 | 12/1979 | Yates et al. | 44/10 B |
| 4,220,453 | 9/1980 | Holder | 44/10 B |
| 4,302,210 | 11/1981 | Duncan | 44/24 |
| 4,308,033 | 12/1981 | Gunnerman | 44/589 |
| 4,333,738 | 6/1982 | Schrader | 44/15 B |
| 4,436,526 | 3/1984 | Holder | 44/589 |
| 4,552,666 | 11/1985 | Müller | 44/605 |
| 4,654,049 | 3/1987 | Smith, Jr. | 44/10 B |
| 5,250,080 | 10/1993 | Michelena et al. | 44/575 |

*Primary Examiner*—Margaret Medley
*Attorney, Agent, or Firm*—Zarley, McKee, Thomte, Voorhees & Sease

[57] ABSTRACT

A method for making artificial fireplace logs includes the initial step of mixing a quantity of grass clippings and leaves with a quantity of wood chips and sawdust to form a mixture. A liquid binder is then added to the mixture until the binder coats the mixture. The coated mixture is then compressed in a mold to form a compacted mass. Once the mass has solidified, it is removed from the mold. Preferably, the proportion of grass clippings and leaves is in a range of 60%–80% by weight of the total weight of all materials of the compacted mass.

6 Claims, 1 Drawing Sheet

ARTIFICIAL FIREPLACE LOG AND METHOD FOR MAKING THE SAME

TECHNICAL FIELD

The present invention relates generally to artificial fireplace logs, and more particularly to an artificial fireplace log which utilizes conventional grass clippings, leaves, twigs, and other yard waste as the major component thereof.

BACKGROUND OF THE INVENTION

Artificial fireplace logs are well known in the prior art, and have been sold commercially for use in fireplaces for a number of years. For example, the synthetic log disclosed in U.S. Pat. No. 4,179,269 issued to Willard Yates describes a combination of 55-80% by weight of ground coal mixed at room temperature with a small quantity of wood fiber, ranging up to 10% by weight. A melted slack wax is mixed with that combination in proportions ranging from 20-35% by weight, such that a putty-like, extrudable mixture is formed. The mixture is then fit to an extruder while at a temperature elevated slightly above normal room temperature to form an extruded cylindrical mass. The extruded mass is then cut to the desired lengths to form logs, the logs being rolled in a flame coloring agent and then wrapped for shipment.

U.S. Pat. No. 4,333,738 to Jimmy Schrader also discloses a synthetic fire log formulated from a combination of wood fibers, coal liquid, molasses and paraffin wax in a particular method in order to provide a long burning time and high BTU output.

With heighten concern for the environment, and the utilization of fuels developed from renewable resources, a fireplace log was patented by Norman Duncan which comprised a combination of sawdust, wax, cotton lint, a hardwood charcoal powder, and a binder, as disclosed in U.S. Pat. No. 4,302,210. A specific portion of the components were mixed together and molded by an extrusion device to produce a long burning artificial log.

While the Duncan patent recognized the need for utilizing renewal for resources, there has been a general failure to recognize the potential use of a renewable resource which currently is deposited in landfills, or burned in the open. More specifically, many communities require that residential property owners retain all yard waste, including grass clippings, leaves, and twigs, and either compost them, or ship them to a central composting location. In many cases, such yard waste is not accepted in sanitary landfills.

SUMMARY OF THE INVENTION

It is there fore a general object of the present invention to provide an artificial log for use in fireplaces which includes conventional yard waste as a major component thereof.

Another object of the invention is to provide an artificial log which combines specific amounts of renewable plant products and waste materials with binders, and extrusion molding the combination to provide a fuel efficient and environmentally valuable renewable energy resource.

These and other objects will be apparent to those skilled in the art.

The method for making artificial fireplace logs of the present invention includes the initial step of mixing a quantity of grass clippings and leaves with a quantity of wood chips and sawdust to form a mixture. A liquid binder is then added to the mixture until the binder coats the mixture. The coated mixture is then compressed in a mold to form a compacted mass. Once the mass has solidified, it is removed from the mold. Preferably, the proportion of grass clippings and leaves is in a range of 60%-80% by weight of the total weight of all materials of the compacted mass.

DESCRIPTION OF THE PREFERRED EMBODIMENT

Figure 1:
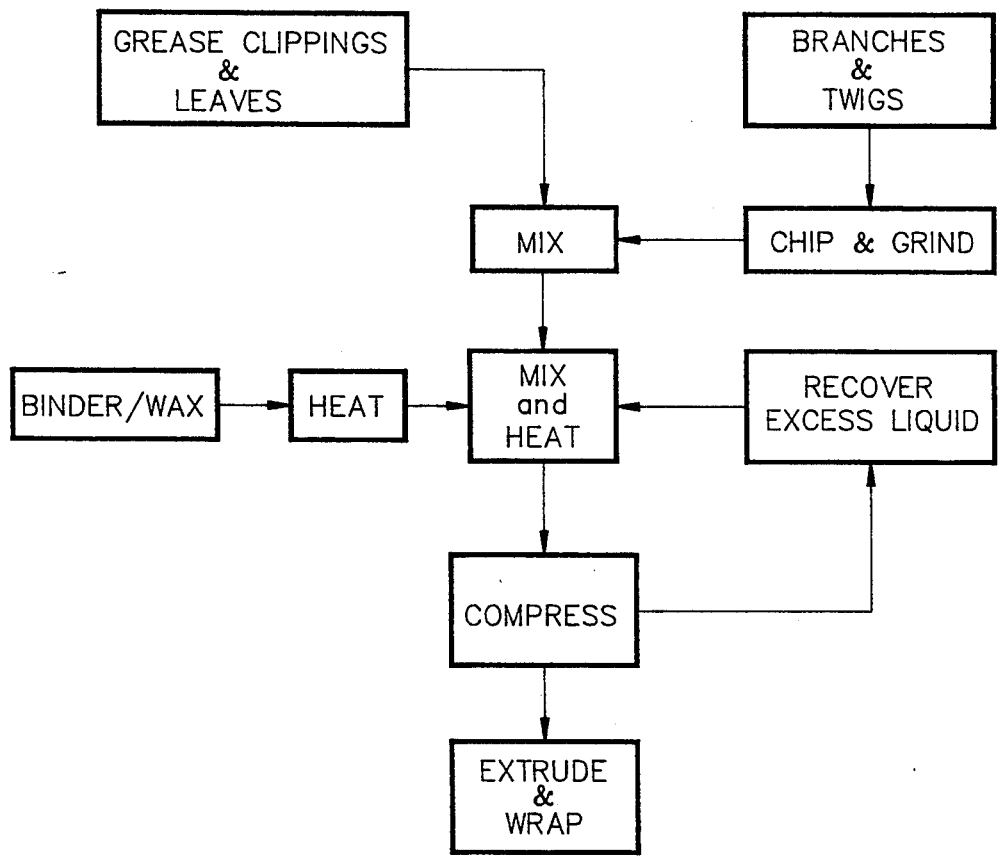
FIG. 1 is a block diagram of the various steps in a method for making the artificial fireplace log of the invention.
Figure 2:
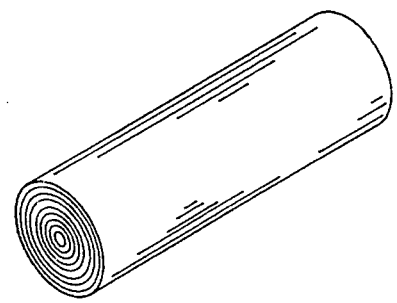
FIG. 2 is a perspective view of an artificial fireplace log made according to the process of FIG. 1.

Referring now to the drawings, in which similar or corresponding parts are identified with the same reference numeral, and more particularly to FIG. 1, there is shown the preferred method for making artificial fireplace logs of the present invention.

Initially, conventional yard waste consisting of grass clippings and leaves are gathered and placed in a mixer. In addition, twigs, sticks and branches are placed in a chipper to be ground into small wood chips and sawdust. The wood chip and sawdust combination is also deposited into the mixer. The mixer includes a heater to maintain the combination of grass clippings, leaves, wood chips and sawdust at a temperature high enough to melt wax (typically 120°-160° F). A quantity of wax is then heated to liquify the wax, and is then added to the heated product in the mixer.

The entire mixture is mixed until all of the components are coated with the binder material. Thereafter, the resulting mixture is compressed in a suitable mold and permitted to cool. Once the mixture has cooled to solid form, the compressed mixture is extruded or cut to the desired length and preferably wrapped in a paper container suitable for shipping, storage and use as an ignition source.

The preferred blend of the above components comprising the artificial log are as follows (by weight):

| COMPONENT | PREFERRED RANGE |
| --- | --- |
| Grass Clippings and leaves | 60-80% |
| Wood chips and sawdust | 10-15% |
| Binders and oils | 5-10% |

While the grass clippings and leaves may be of any relative proportions to one another, in the preferred embodiment of the invention the combination is approximately one-half grass clippings and one-half leaves. Preferably, the leaves are not so dry that they crumble into very fine dust particles.

In order to provide a consistent and uniform log density, twigs, sticks and branches must be ground into small chips and sawdust form, before being added to the grass clippings and leaves. Obviously, the sawdust and wood chips may be waste products from saw mills, or the like, rather than specifically from yard waste.

The binder material may be any, resin glue (such as common wood glue) and/or various types of wax. A wide variety of wax may be utilized as a component of the artificial log of this invention. Some preferred materials are paraffin wax with a melting point of 120°-140° F. Of course, other types of wax, such as refined wax, petroleum wax and commercial wax may also be utilized both as a binder and to provide fuel for the continual burning of the log.

In one example of the present invention, the inventor combined 8 ounces of $\frac{3}{4}'' \times \frac{3}{4}''$ wood chips to grass clippings, leaves and twigs within a conventional trash compactor. Paraffin wax was then heated and approximately 10 ounces were poured into the mixture within the trash compactor and stirred until all items were coated with the paraffin wax. Upon compressing the mixture, at approximately 2,000 pounds per square inch, a compacted mass of approximately $2'' \times 9'' \times 16''$ was formed, with a total weight of about $1\frac{1}{2}$ pounds. Upon combustion, the "log" produced 25 minutes of hot flame, and an additional 15 minutes wherein the flame was medium to low.

In a second example, a 3 pound log was produced by adding grass clippings, leaves, and sticks with 2 ounces of wood chips (of approximately $\frac{3}{4}'' \times \frac{3}{4}''$ size) within a trash compactor. Again, hot paraffin wax was added and mixed with the components to form a coated mixture, and thence compressed. The 3 pound log had dimensions of approximately $3\frac{1}{2}'' \times 9'' \times 16''$ and burned with a hot flame for 45 minutes. A smaller flame continued for another 15 minutes. Poking the log with a poker increases the burn time by another 20 minutes.

The inventor has also found that the addition of scented lamp oils as one of the components of the binder adds a scent to the burning log which is distributed throughout the log, thereby releasing the scent throughout the burning time of the log. Such lamp oils also had fuel for the continual burning of the log.

During the step of compressing the mixture of yard waste, binders and oils, it is typical for excess liquid binder, wax and oil to drain from the compression chamber. In the preferred method, this drain combination of binders and oils is directed to a storage container for use in subsequent mixtures.

Whereas the invention has been shown and described in connection with the preferred embodiment thereof, many modifications, substitutions and additions may be made which are within the intended broad scope of the appended claims.

I claim:

1. A method for making artificial fireplace logs, comprising the steps of mixing grass clippings and leaves taken directly from a lawn without further processing and in an amount in a range of 60-80% by weight of the total weight of all materials with wood chips and sawdust in an amount within the range of 10-15% by weight of the total weight to form a mixture; adding a binder selected from the group consisting of resin glues and waxes in liquid form to said mixture and mixing until the binder coats the mixture; compressing said coated mixture in a mold to form a compacted mass; and removing said compacted mass from said mold after said mass has solidified.

2. The method of claim 1, wherein said binder is paraffin wax heated to a temperature in the range of 120°-140° F.

3. The method of claim 1, wherein the proportion of binders added to the mixture is within the range of 5-10% of the total weight of all materials utilized to form the compacted mass.

4. The method of claim 1, wherein said binder is resin glue.

5. The method of claim 1, further comprising the step of adding scented oil to said mixture, to provide an aroma upon burning of the compacted mass.

6. An artificial fireplace log made according to the method of claim 1.

* * * * *